(12) United States Patent
Kampe

(10) Patent No.: US 7,158,926 B2
(45) Date of Patent: Jan. 2, 2007

(54) CLUSTER AVAILABILITY MODEL

(75) Inventor: Mark A. Kampe, Los Angeles, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 887 days.

(21) Appl. No.: 10/076,505

(22) Filed: Feb. 19, 2002

(65) Prior Publication Data

US 2002/0077800 A1 Jun. 20, 2002

Related U.S. Application Data

(63) Continuation-in-part of application No. 09/850,183, filed on May 7, 2001.

(60) Provisional application No. 60/202,154, filed on May 5, 2000.

(51) Int. Cl.
G06F 9/45 (2006.01)
G06F 9/44 (2006.01)
G06F 17/50 (2006.01)

(52) U.S. Cl. .............................. 703/22; 703/2; 703/21; 716/4; 716/13

(58) Field of Classification Search .................... 703/2, 703/21, 22; 714/4, 13
See application file for complete search history.

(56) References Cited

U.S. PATENT DOCUMENTS

| 5,014,220 A | 5/1991 | McMann et al. .............. 706/45 |
| 6,438,705 B1* | 8/2002 | Chao et al. ..................... 714/4 |
| 6,691,244 B1* | 2/2004 | Kampe et al. ................. 714/4 |
| 6,823,474 B1* | 11/2004 | Kampe et al. ................. 714/13 |
| 2001/0056461 A1* | 12/2001 | Kampe et al. .............. 709/201 |
| 2002/0007468 A1* | 1/2002 | Kampe et al. ................. 714/4 |
| 2002/0042693 A1* | 4/2002 | Kampe et al. .............. 702/186 |
| 2003/0041138 A1* | 2/2003 | Kampe et al. .............. 709/223 |

FOREIGN PATENT DOCUMENTS

EP 0 773 649 A2 5/1997

OTHER PUBLICATIONS

Mendiratta, V.B. "Reliability Analysis of Clustered Computing Systems," Proc. of the 9th Int'l Symposium on Software Reliability Engineering. Nov. 4-7, 1998, pp. 682-272.*
Wein, A.S. et al. "Validating Complex Computer System Availability Models." IEEE Transactions on Reliability. Oct. 1990. vol. 39, Issue 4, pp. 468-479.*
Nicola, V.F. et al. "Fast Simulation of Highly Dependable Systems with General Failure and Repair Processes," IEEE Transactions on Computers. Dec. 1993. vol. 42, Issue 12, pp. 1440-1452.*

(Continued)

Primary Examiner—Paul L. Rodriguez
Assistant Examiner—Aval I. Sharon
(74) Attorney, Agent, or Firm—Kent A. Lembke; William J. Kubida; Hogan & Hartson LLP

(57) ABSTRACT

The present invention describes a method and system for creating a cluster availability model that takes into account availabilities of software components in the cluster. Aspects of the disclosure include defining a repair model and failure parameters for a repair mode in the repair model, and modeling availabilities of software components based on the repair mode and failure parameters. Additional aspects include combining availability models of software components in a computationally feasible manner and determining repair rates of node and cluster reboots. A cluster availability model is determined using the combined availability models of software components and the repair rates of node and cluster reboots.

28 Claims, 6 Drawing Sheets

OTHER PUBLICATIONS

Johnson, A. et al. "Survey of Software Tools for Evaluating Reliability, Availability, and Serviceability." ACM Computing Surveys (CSUR). Dec. 1988. vol. 20, Issue 4, pp. 227-269.*

Vaidyanathan, K. et al. "Analysis and Implementation of Software Rejuvenation in Cluster Systems." Proc. of the 2001 ACM SIGMETRICS Int'l Conf. 2001. pp. 62-71.*

Cristian, F. "Understanding Fault-Tolerant Distributed Systems." Communications of the ACM. Feb. 1991. vol. 34, No. 2, pp. 57-78.*

Krishnan, R. "A Failure and Overload Tolerance Mechanism for Continuous Media Servers." Proc. of the 5th ACM Int'l Conf. on Multimedia. 1997. pp. 131-142.*

Cramp, Randy, Volk, Miadan A., Jones, Wendell, On Operational Availability of a Large Software-Based Telecommunications System; Software Reliability Engineering; 1992 Proc. $3^{rd}$ Int'l Symposium on Research Triangle Park, NC; 1992; pp. 358-366.

Pantoglou, G., A Semi-Markov Model for the Software Error Correction Process; Berlin, Germany, vol. 13, No. 4, 1984; pp. 192-195.

* cited by examiner

CLUSTER AVAILABILITY MODEL

CROSS-REFERENCE TO RELATED APPLICATIONS

This application is a continuation-in-part of U.S. application Ser. No. 09/850,183 filed May 7, 2001 and entitled "A MEANS FOR INCORPORATING SOFTWARE INTO AVAILABILITY MODELS," which in turn claims benefit U.S. Provisional Patent Application No. 60/202,154 filed May 5, 2000, and entitled "MEANS FOR INCORPORATING SOFTWARE INTO AVAILABILITY MODELS," both of which are hereby incorporated by reference.

BACKGROUND OF THE INVENTION

1. Field of the Invention

The present invention relates to a cluster availability model that takes into account availability of software components in a cluster. More particularly, the present invention relates to a method and system for modeling the availability of a cluster by aggregating availability information of individual software components in the cluster in a computationally efficient manner.

2. Discussion of the Related Art

Availability modeling of a cluster is becoming increasingly important. Such modeling reduces costs of implementing a cluster because errors and problems can be identified early in the design process. In addition, different components within the cluster may be changed, added, or deleted during testing and evaluation to reflect advances in technology or network requirements. Components may be hardware devices, software applications and/or a combination of both. An availability model preferably incorporates information about each of the components in a cluster, their reliability, and the behavior of the system in cases of component failure, to yield an overall availability prediction for the entire system.

A hardware repair may be relatively simple. Typically, repairing involves manual operations by human technicians. For example, a service technician may replace a defective component. As such, the repair rates of hardware may be determined by response time, travel time, spare parts availability, and the time to perform specific service operations. With hardware, the interdependencies between components tend to be tree structured, and failure modes and repair actions associated with different modules tend to exhibit a high degree of independence. Because of the modularity, it is often possible to model complex hardware systems based on the outputs of models of the individual components. It may not be necessary for system models to include all of the details from the individual component models. There may be a large number of models to deal with, but they are rarely prohibitively complex.

Software repairs, however, differ from hardware repairs in many respects. First, there may be a multiplicity of ways to repair a particular problem, such as restarting the program, rebooting the node, or rebooting the entire cluster. Second, each of the possible repair techniques can take a different amount of time. Third, as initial repair efforts often fail, it is necessary to associate an efficacy (likelihood of success) with each repair technique. Fourth, software repairs may involve a hierarchical escalation of repair measures. For example, if a particular problem is not fixed by restarting the program, the next step may be to reboot the entire node. The above differences make it difficult to arrive at an availability model of software components in the cluster.

Further, with software, there tends to be many more cross-level interactions, and many repair actions (e.g., node rebooting) which affect a large number of components. Because of this, an availability model for a complex software environment may have to incorporate detailed models for each software component, thus making the whole-system model very complex (perhaps exponential in the number of components). Because of this complexity, system architects often try to avoid incorporating detailed software failure and recovery behavior into their system availability models.

The functionality of newer systems is becoming increasingly dominated by software, and many key elements of the repair/recovery process are now being performed by software. As such, it is no longer practical to ignore software behavior when attempting to model system availability. A realistic system availability model must model the failure and recovery behavior of the software in that system. There is a great need for availability modeling techniques that include the failure and recovery behavior of all of the system's software components, while still yielding models of manageable complexity with reasonably determinable parameters.

SUMMARY OF THE INVENTION

The present invention relates to a cluster availability model. In particular, the present invention provides a method and system for modeling availability of a cluster with software components with at least one node in a computationally feasible manner.

To achieve these and other advantages and in accordance with the purposes of the present invention as embodied and broadly described herein, the present invention provides a method for modeling the availability of a cluster, the cluster having a plurality of software components and at least one node, the method including determining a plurality of component availability models using a repair model and a plurality of failure parameters, each of the plurality of component availability models corresponding to one of the plurality of software components; combining the plurality of component availability models; determining repair rates for node and cluster reboots; and constructing an availability model based on the repair rates and the combined plurality of component availability models.

In one embodiment, the invention provides a system for modeling the availability of a cluster, the cluster having a plurality of software components and at least one node, the system including means for determining a plurality of component availability models using a repair model and a plurality of failure parameters, each of the plurality of component availability models corresponding to one the plurality of software components; means for combining the plurality of component availability models; means for determining repair rates for node and cluster reboots; and means for constructing an availability model based on the repair rates and the combined plurality of component availability models.

In an alternate embodiment, the invention provides a method for modeling the availability of a cluster, the cluster having a plurality of software components and at least one node, the method including specifying a repair model, the repair model having one or more repair modes; specifying a plurality of failure parameters, for each software component in the plurality of software components, assigning values to the plurality of failure parameters for each appropriate repair mode for the software component; combining values of the plurality of failure parameters of the plurality of software components for each repair mode in the repair model; determining repair rates for node and cluster reboots; and constructing an availability model based on the repair rates and the combined plurality of failure parameters.

In an alternate embodiment, the invention provides a computer program product comprising a computer useable medium having computer readable code embodied therein for modeling the availability of a cluster, the cluster having a plurality of software components and at least one node, the computer program product adapted when run on a computer to effect steps including determining a plurality of component availability models using a repair model and a plurality of failure parameters, each of the plurality of component availability models corresponding to one of the plurality of software components; combining the plurality of component availability models; determining repair rates for node and cluster reboots; and constructing an availability model based on the repair rates and the combined plurality of component availability models.

Additional features and advantages of the invention are set forth in the description that follows, and in part are apparent from the description, or may be learned by practice of the invention. The objectives and other advantages of the invention are realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description, serve to explain the principles of the invention. In the drawings.

DETAILED DESCRIPTION OF THE PREFERRED EMBODIMENTS

Figure 1:
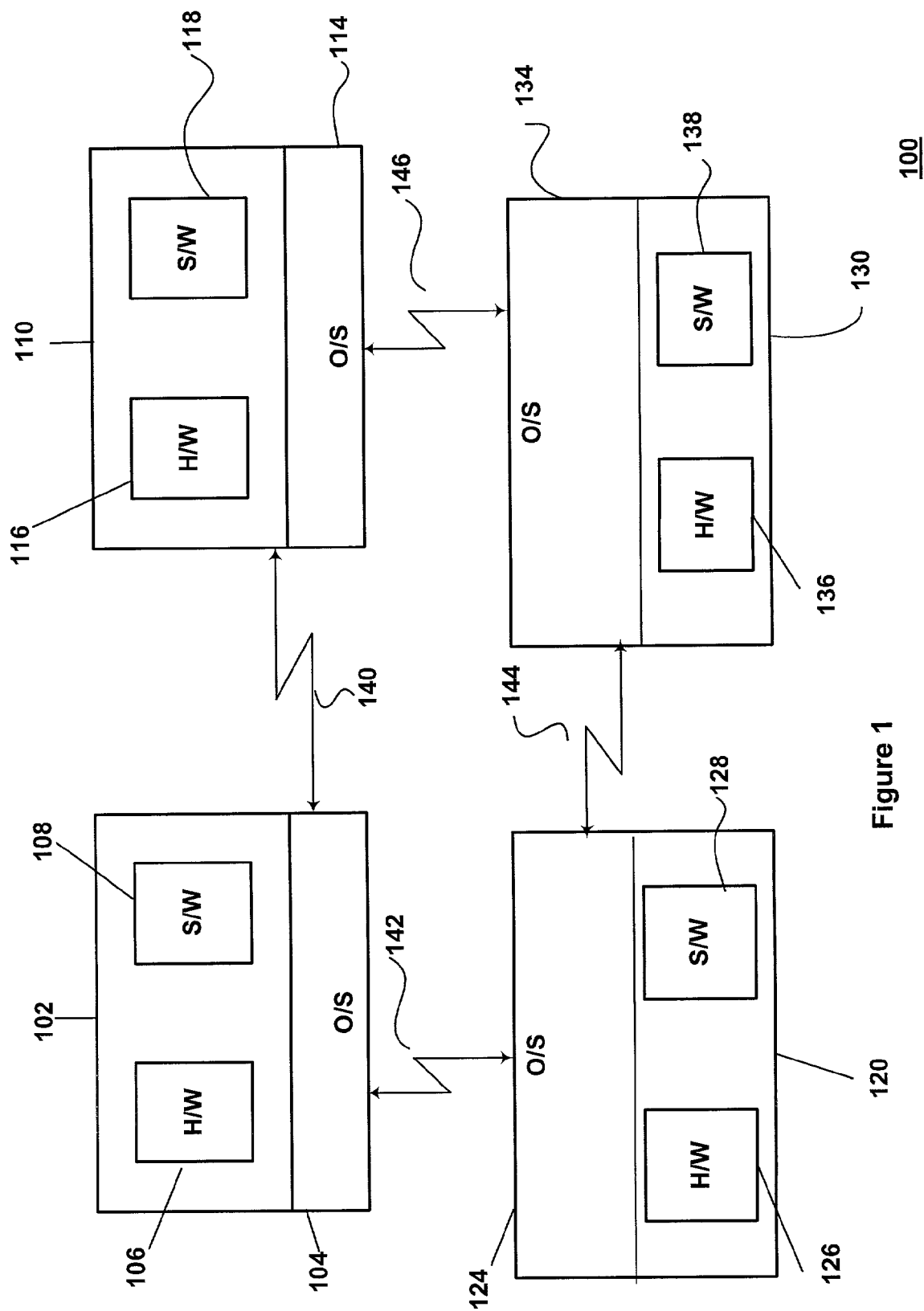
FIG. 1 is a representational diagram of a cluster whose availability may be modeled using the present invention.

Reference is now made in detail to the preferred embodiments of the Present invention, examples of which are illustrated in the drawings.

FIG. 1 is a simplified representational diagram of a cluster whose availability may be modeled using the present invention. A cluster 100 includes nodes 102, 110, 120 and 130. The nodes 102, 110, 120 and 130 may be computers or any platform that has hardware and software components. Preferably, the nodes 102, 110, 120 and 130 can execute instructions from a computer-readable medium and store data.

The cluster 100 may include any number of nodes. Nodes are connected to each other via a network. In FIG. 1, a network 142 connects the nodes 102 and 120, a network 144 connects the nodes 120 and 130, a network 146 connects nodes 130 and 110, and a network 140 connects the nodes 110 and 102. As such, the nodes 102, 110, 120, 130 in the cluster 100 can exchange information, such as messages, data packets and the like, using the networks 140, 146, 144 and 142.

The node 102 includes operating system 104, a set of hardware components 106 and a set of software applications 108. The operating system 104 and the set of software applications 108 may be considered software components of the node 102. Repairs to software components may include restarting an application, rebooting the node 102, and other activities including those that may necessitate hardware fixes and/or repairs.

The operating system 104 may be a program that, after being initially loaded into the node 102 by a boot program, manages all the other programs on the node 102, including the set of software applications 108. The set of software applications 108 may make use of the operating system 104 by making requests for services through a defined application program interface, for example. In addition, users may interact directly with the operating system 104 through a user interface such as a command language or a graphical user interface.

The set of hardware components 106 may be logic circuits, a memory, a power supply, or any other types of hardware within the node 102. The node 102 may include any number of hardware components 106, and is not limited by the embodiment depicted in FIG. 1. A hardware component in the set of hardware components 106 may have a failure rate, such as a mean time between failures and a repair time. It should be appreciated that there are a variety of availability models for hardware components. Any suitable model may be used to model availability of the set of hardware components 106.

Similarly, the nodes 110, 120 and 130 have operation systems 114, 124 and 134, sets of hardware components 116, 126 and 136, and sets of software applications 118, 128 and 138, respectively. In other words, the nodes 110, 120 and 130 are similar to the node 102 in that each node has an operating system, a set of hardware components, and a set of software applications.

The operating systems 104, 114, 124 and 134 may be the same operating systems, or, alternatively, may be different operating systems that are able to exchange information. Messages, information, files and the like may pass through the nodes without obstruction by the operating systems. Further, the hardware and software components on the nodes 102, 110, 120 and 130 may differ. For example, applications in the set of software applications 108 may be different from applications in the set of software applications 138.

Hardware components in the set of hardware components 106, 116, 126 and 136 may have different failure rates and repair times. In addition, software components in the nodes 102, 110, 120 and 130 may have different failures, failure resolution actions and recovery times. Thus, though the nodes 102, 110, 120 and 130 may be within the cluster 100, they may not be configured identically.

In one embodiment, an availability model for the cluster 100 may incorporate availability information of the following: (1) the cluster itself; (2) its nodes 102, 110, 120 and 130;

(3) the operating systems 104, 114, 124 and 134; (4) the set of hardware components 106, 116, 126 and 136; and (4) the set of software applications 108, 118, 128 and 138. Further, such availability model is constructed in a computational feasible manner using a repair model and failure parameters, both of which are also described in detail below.

Figure 2:
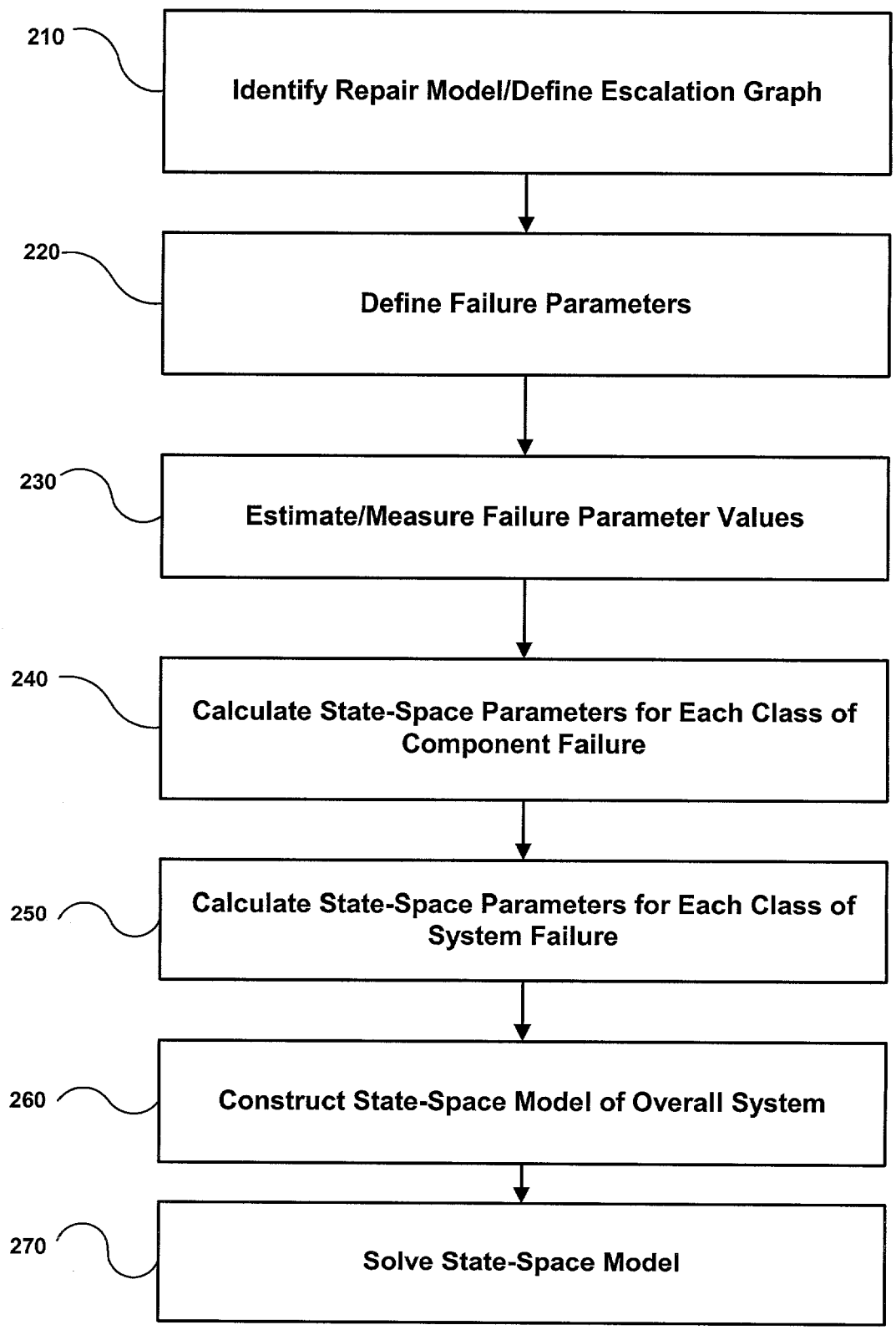
FIG. 2 is a flowchart depicting one example of a set of operations in one embodiment of the present invention.

FIG. 2 shows example operations that may be performed in one embodiment of the present invention to construct a cluster availability model. At step 210, a repair model to be used in modeling component availability is identified. For example, application developers who are familiar with the software component may make such identification. A repair model is used to categorize and distinguish software component failures on the basis of their service impact and types of repair actions that can be applied on failed software components. The repair model may include repair modes such as component soft-reset, component warm-restart, component cold-restart, component fail-over, node reboot and cluster reboot. It should be appreciated that the present invention in its broader context is not dependent on the use of specific repair modes in a repair model.

A component soft-reset mode may reflect those failures having a recovery action that is automatically initiated by a component manager, for example. Component soft-reset may include a warm restart of an application, or a warm restart only of a subset of the application.

A component warm-restart mode may include terminating an application and restarting it using saved information regarding the application.

A component cold-restart mode may reflect those failures resolved by terminating and restarting the application. When an application is restarted under the cold-restart mode, any previously saved information regarding the application may be ignored, potentially resulting in a greater service interruption.

A component fail-over mode may reflect those failures resolved by having all components on the affected node fail over to a hot standby.

A node reboot mode may occur when errors are not resolved after all components fail-over to another node. Node reboot may involve a complete reboot of the affected node and a restart of all components that reside on the affected node. Node reboot may occur after all the application specific recovery actions disclosed above fail.

Finally, if node reboot fails, a cluster reboot may be performed. A cluster reboot may involve a shutdown and reboot of all nodes in the cluster. In other words, it may involve restarting all hardware and software components running on the cluster.

Figure 3:
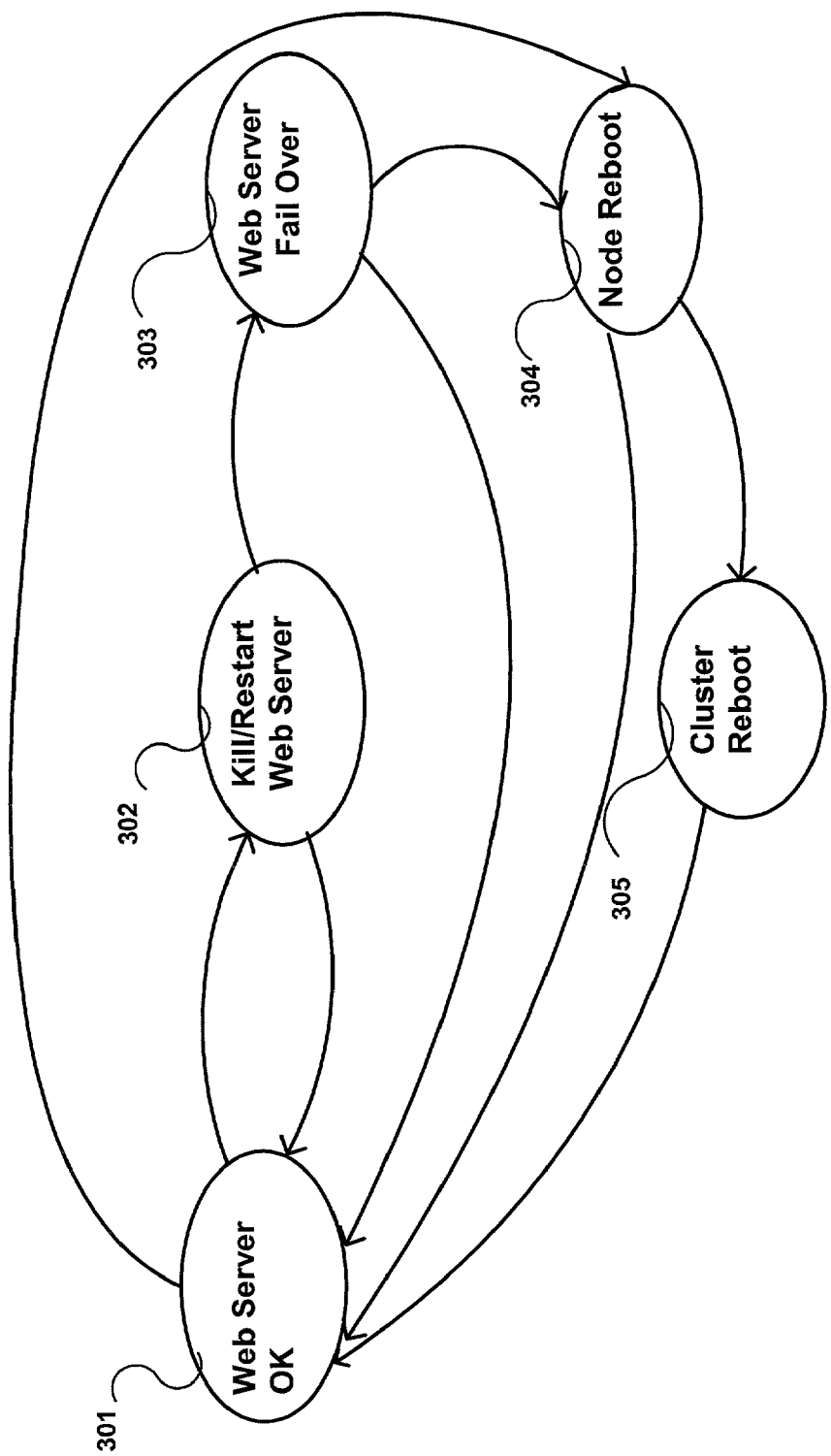
FIG. 3 is a representational diagram showing an example of an escalation graph in accordance with an embodiment of the present invention.

For each software component, there typically are a number of repair actions that may be applied. At step 210, an escalation graph may be defined to describe repair actions that may be applied to a software component, and the relationship among them (e.g., to describe what the next repair action will be if a prior action fails). Such an escalation graph may be defined for each of the software components in a cluster. For example, faced with a failed software component, one may first attempt component soft-restart. When this action fails, one may escalate to component cold-restart, or even to node reboot. In other words, a number of repair modes may apply to a software component, depending on factors such as a severity of a problem and effectiveness of a particular repair. FIG. 3, discussed infra, illustrates an example of an escalation graph.

To enhance the accuracy of a cluster availability model, it is desirable to accurately categorize failures of software components, or repair modes for software component failures. A failure mode can be described in terms of an expected failure rate and its impact on service. A repair mode can be described in terms of an expected repair time (though for modeling reasons, this is usually also expressed as a rate), and a probability of success (often referred to as its efficacy).

At step 220, component failure parameters, which parameterize each class of component failures, are defined. These parameters are used to describe each mode of failure or repair. Examples of failure parameters include (1) a failure rate, or inversely, a mean-time-between-failure ("MTBF"); (2) a repair rate, or inversely, a mean-time-to-repair ("MTTR"); and efficacy or a fraction of repair attempts that are likely to succeed. It should be appreciated that the present invention is not dependent on the use of specific failure parameters.

At step 230, failure parameter values are calculated. In estimating these values, one may rely on any number of measures, such as traditional techniques, measuring relevant variables and using estimations. For example, when using failure rate, repair rate, and efficacy as failure parameters, one may use traditional techniques to estimate failure rates. As to repair rates, one may have application developers specify or measure the times that an application requires for each component-level repair action. An efficacy may initially be estimated by application developers and then refined later with measured data. Platform developers and integrators may specify or measure the times that a bare platform requires for a node or cluster reboot, and the efficacy for node reboots. It should be appreciated that other methods may be used to calculate or estimate failure parameter values. Step 230 is described in more detail with regard to FIG. 4, discussed infra.

Turning to step 240, for each class of component failure, values of state-space parameters to be used in an availability model are calculated. These parameters may be obtained, for example, by aggregating availability information of each software component, e.g., aggregating failure rates, aggregating repair rates, and aggregating repair efficacies. In calculating these values, one may assume that software components in a cluster are statistically independent. As such, it is assumed that there is no coupling of failures, i.e., an occurrence of one failure does not affect a likelihood of an occurrence of another failure. Step 240 is described in more detail with regard to FIG. 5, discussed infra.

At step 250, for each class of system failure, values of state-space parameters to be used in an availability model are calculated. These parameters may be obtained, for example, by using aggregate failure rates, aggregate repair rates, and aggregate repair efficacies for node and cluster reboots. One of ordinary skill in the art will appreciate that independence between each class of system failure is not assumed. Step 250 is described in more detail with regard to FIG. 5, discussed infra.

Figure 6:
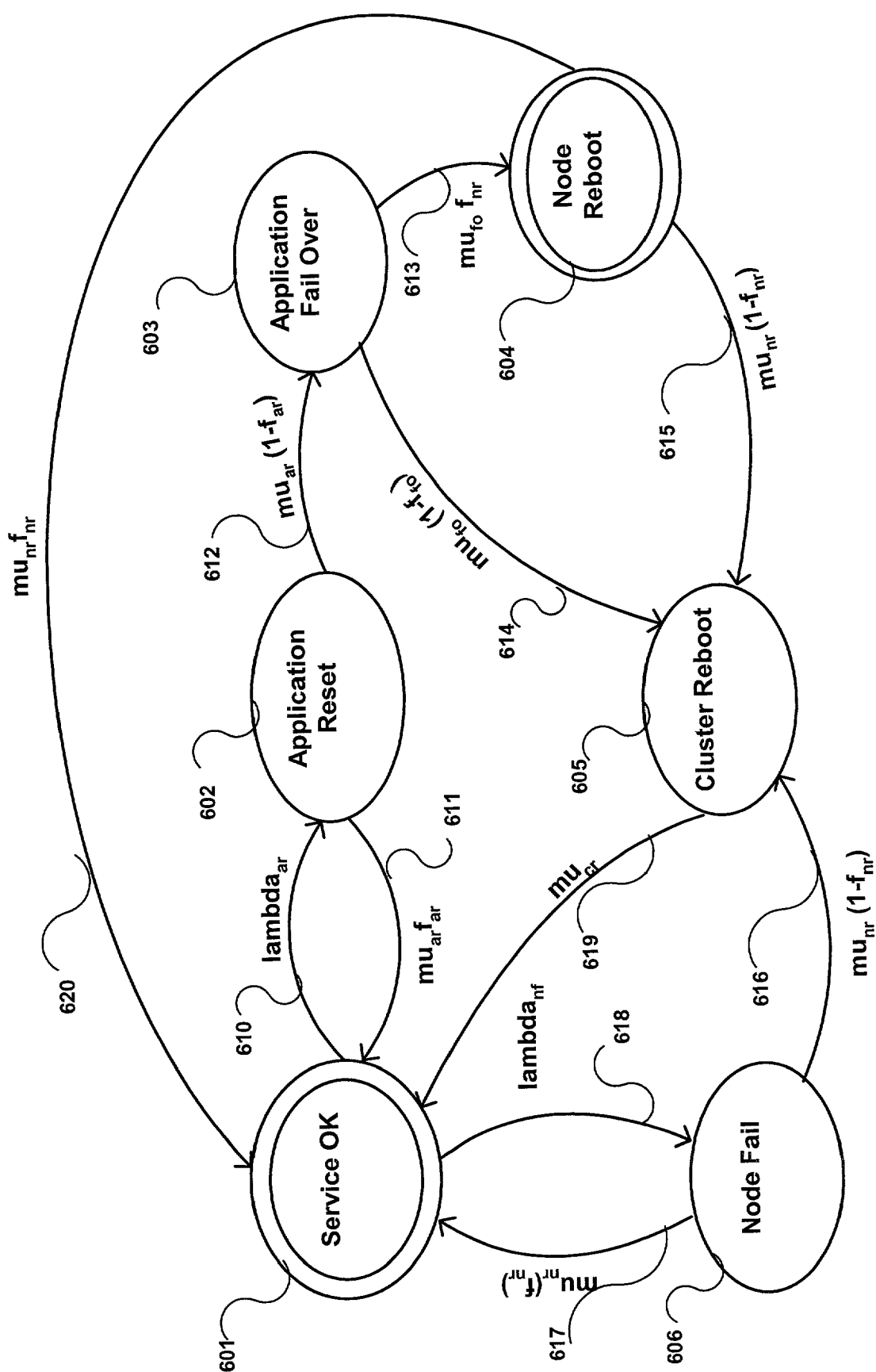
FIG. 6 is a diagram illustrating one example of a state-space model in accordance with an embodiment of the present invention.

An availability model of a cluster may be represented as a continuous-time Markov model. As such, the availability of the cluster may be represented as a steady-state occupancy rate for each repair mode in the repair model. At step 260, a state-space model of an overall system is constructed using the state-space parameters calculated in steps 240 and 250. In a state-space model, each repair mode may be assumed to have a well-specified impact on a service and may be represented as a discrete state in the model. State-space parameters are used to arrive at transition rates between the various states. In the model, imperfect recovery may be modeled by multiplying as two arcs (one to a successful repair state and the other to an escalation state), using the aggregate rates and aggregate efficacies computed in steps 240 and 250. An example of a state-space model is illustrated in FIG. 6, discussed infra.

At step 270, a state-space model is solved using any of traditional means for solving a continuous-time Markov model. This step produces a steady-state occupancy rate for each state in the model. Since each state represents a known level of services, one may estimate service availability of a cluster using appropriate state occupancy rates.

FIG. 3 shows one example of an escalation graph for a software component. Specifically, FIG. 3 shows an escalation graph for a web server application. The web server is associated with four repair modes: "kill/restart web server" (node 302), "web server fail over" (node 303), "node reboot" (node 304) and "cluster reboot" (node 305). Node 301 represents a "web server OK" state, or the state in which a web server is functioning normally.

Directed edges in the escalation graph indicate an escalating series of repair actions that may be applied to the web server. When a web server fails, one may first attempt to "kill/restart web server" (node 302) or to "node reboot" (node 304). If the "kill/restart web server" option is successful, one would go back to "web server OK" (node 301). Otherwise, one may escalate to "web server fail over" (node 303). If this repair action fails, one may escalate to "node reboot" (304) and then to "cluster reboot" (305). Alternatively, one could skip "web server fail over" (node 303) and go to "node reboot" (node 304) instead. Thus, an escalation graph shows how responses may be escalated to deal with a software component failure.

Figure 4:
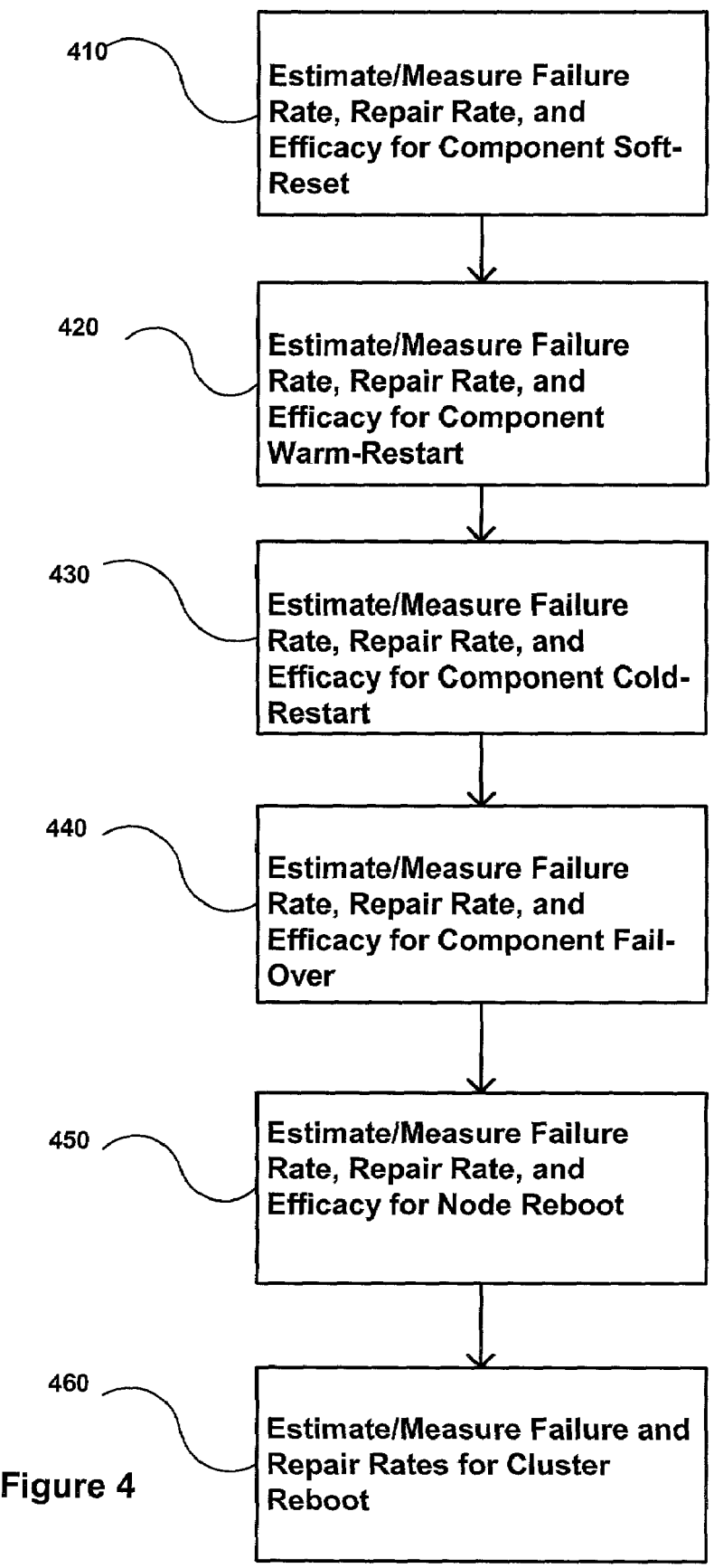
FIG. 4 is a flowchart illustrating one example of operations that may be used in determining a component availability model of one embodiment of the present invention.

FIG. 4 is a flowchart showing one example of modeling availability of OS and non-OS applications. Although the flow chart illustrates the steps serially, it should be appreciated that the present invention is not dependent on the steps being performed in any particular order. For a non-OS application, a value of each failure parameter for a component soft-reset, component warm-restart, component cold-restart and component fail-over may be determined by application developers, at steps 410, 420, 430 and 440, respectively. Specifically, assuming that one uses failure rate, repair rate and efficacy as failure parameters, at step 410, values of the failure rate, repair rate and efficacy for a component soft-reset are estimated or measured. At step 420, values of the failure rate, repair rate and efficacy for a component warm-restart are estimated or measured. At step 430, values of the failure rate, repair rate and efficacy for a component cold-restart are estimated or measured. Finally, at step 440, values of the failure rate, repair rate and efficacy for a component fail-over are estimated or measured.

In OS applications, a value of each failure parameter for a node reboot and a cluster reboot may be determined by platform developers at steps 450 and 460, respectively. Assuming that one uses a failure rate, repair rate and efficacy as failure parameters, at step 450, values of the failure rate, repair rate and efficacy for a node reboot are estimated or measured. At step 460, values of the failure rate, repair rate, and efficacy for a cluster reboot are estimated or measured. The rates determined in steps 450 and 460 are for the bare platform, and are exclusive of the time to restart all of the applications.

Figure 5:
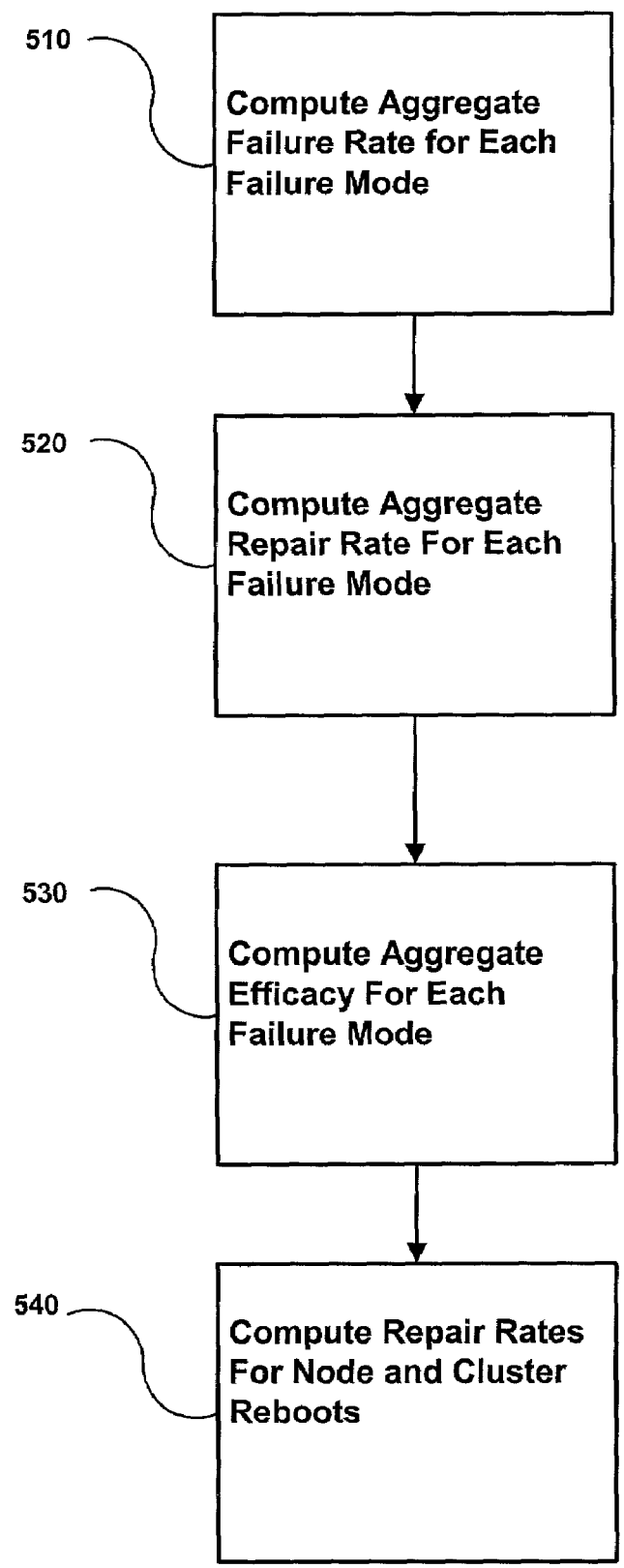
FIG. 5 is a flowchart showing one example of operations that may be used to aggregate availability information regarding components in a cluster in one embodiment of the present invention.

FIG. 5 shows one example of operations that may be performed in finding state-space parameters for a cluster availability model that uses a failure rate, a repair rate, and an efficacy as failure parameters. Although the operations are illustrated serially, it should be appreciated that the present invention is not dependent upon their performance in any particular order. Steps 510 through 530 relate to component failure modes and, as such, application developers may perform the computations. Step 540 relates to system failure and platform developers may perform the computations. Turning to step 510, an aggregate failure rate for each failure mode is computed. For example, an aggregate failure rate may be a sum of failure rates of all software components that contribute to that failure mode.

At step 520, an aggregate repair rate for each failure mode is computed. An aggregate repair rate may be a failure-rate weighted average of the repair rates for all components contributing to that failure mode.

At step 530, an aggregate efficacy for each failure mode is computed. Like an aggregate repair rate, a failure-rate weighted average of the efficacies of all components for that failure mode may be used as an aggregate efficacy.

At step 540, repair rates for node and cluster reboots are determined. For example, repair rates of node and cluster reboots may be obtained by first specifying the times that a bare platform or cluster requires for a node or cluster reboot and an efficacy for node reboots. Second, platform specific summation functions may be defined. Such functions may be used to recognize a possibility of parallel initialization of multiple applications, for example. An example of such functions includes a sum of cold restart times of a platform or cluster and operating system and software-component cold restart times. Another example includes a sum of reboot time of a bare platform or cluster and cold reboot times of relevant components. It should be understood that such functions need not be a summation, and that any function that is appropriate for the cluster to be modeled may be used. Finally, repair rates associated with node and cluster reboots can be calculated using the combined restart times in the event that these repair models are appropriate.

As the time to restart applications is non-negligible, the time to restart a node or a cluster must be considered a function of the applications that need to be started. This may be broken down into a basic cluster start-up time and the application cold-start time. To a first approximation, the node reboot time should be the basic platform reboot time plus the cold-start times for all of the configured applications. It is important to note, however, that there can be some parallelism in these start-up activities, and so there may be a platform-specific summation function that is more complex than a simple sum.

FIG. 6 shows one example of a steady-state model that is represented as a directed weighted graph. In the diagram of FIG. 6, there are six nodes corresponding to a "service OK" state (node 601), "application reset" state (node 602), "application fail over" state (node 603), "node reboot" state (node 604), "cluster reboot" state (node 605) and "node fail" state (node 606). The "service OK" and "node reboot" states indicate that services are available.

Directed edges between nodes show relationships between corresponding states. For example, one may go from the "service OK" state (node 601) to the "application reset" state (node 602) or the "node fail" state (node 606). Edge weights represent transition rates between two states. In the example shown in FIG. 6, transition rates are represented using following values: an aggregate application failure rate (lambda$_{ar}$), aggregate application-reset repair rate (mu$_{ar}$), aggregate application-reset efficacy (f$_{ar}$), aggregate application fail over repair rate (mu$_{fo}$), aggregate application fail over efficacy rate (f$_{fo}$), aggregate node reboot repair rate (mu$_{nr}$), aggregate node reboot efficacy (f$_{nr}$), aggregate cluster reboot repair rate (mu$_{cr}$), aggregate node failure rate (lambda$_{nf}$) and aggregate node-fail efficacy rate (f$_{nf}$).

Specifically, in FIG. 6, arc 610 represents the aggregate application failure rate (lambda$_{ar}$), which is the probability of transition from the "service OK" state (node 601) to the "application reset" state (node 602). Arc 611 represents the product of the aggregate application-reset repair rate (mu$_{ar}$) and the aggregate application-reset efficacy (f$_{ar}$), which is the probability of transition from the "application reset" state (node 602) back to the "service OK" state (node 601). Arc 612 represents the product of mu$_{ar}$ and (1-f$_{ar}$), which is the probability of transition from the "application reset" state (node 602) to the "application fail over" state (node 603). Arc 613 represents the product of the aggregate application fail over repair rate (mu$_{fo}$) and the aggregate node reboot efficacy (f$_{nr}$), which is the probability of transition from the "application fail over" state (node 603) to the "node reboot" state (node 604). Arc 614 represents the product of mu$_{fo}$ and (1-f$_{fo}$), which is the probability of transition from the "application fail over" state (node 603) to the "cluster reboot" state (node 605). Arc 615 represents the product of the aggregate node reboot repair rate (mu$_{nr}$) and (1-f$_{nr}$), which is the probability of transition from the "node reboot" state (node 604) to the "cluster reboot" state (node 605). Arc 616 represents the product of mu$_{nr}$ and (1-f$_{nr}$), which is the probability of transition from the "node fail" state (node 606) to the "cluster reboot" state (node 605). Arc 617 represents the product of mu$_{nr}$ and f$_{nr}$, which is the probability of transition from the "node fail" state (node 606) to the "service OK" state (node 601). Arc 618 represents the aggregate node failure rate (lambda$_{nf}$), which is the probability of transition from the "service OK" state (node 601) to the "node fail" state (node 606). Arc 619 represents the aggregate cluster reboot repair rate (mu$_{cr}$), which is the probability of transition from the "cluster reboot" state (node 605) to the "service OK" state (node 601). Arc 620 represents the product of mu$_{nr}$ and f$_{nr}$, which is the probability of transition from the "node reboot" state (node 604) to the "service OK" state (node 601).

The above description of embodiments of the present invention has been given by way of examples. From the disclosure given, those skilled in the art will not only understand the present invention and its attendant advantages, but will also find apparent various changes and modifications to the embodiments. It is sought, therefore, to cover such changes and modifications as they fall within the spirit and the scope of the invention as defined by the appended claims and their equivalents.

What is claimed is:

1. A computer program product comprising a computer useable medium having computer readable code embodied therein for modeling the availability of a cluster, the cluster having a plurality of software components and at least one node, the computer program product adapted when run on a computer to effect steps including:
    determining a plurality of component availability models using a repair model and a plurality of failure parameters, each of the plurality of component availability models corresponding to one of the plurality of software components, wherein the plurality of failure parameters include a failure rate, repair rate and efficacy;
    combining the plurality of component availability models, wherein the combining step further comprises obtaining aggregate failure rates, aggregate repair rates, and aggregate efficacies for the plurality of component availability models and wherein the aggregate failure rates, the aggregate repair rates and the aggregate efficacies are obtained for each repair mode in the repair model;
    determining repair rates for node and cluster reboots; and
    constructing an availability model based on the repair rates and the combined plurality of component availability models;
    wherein for each repair mode in the repair model, an aggregate failure rate is a sum of failure rates of the plurality of software components for the repair mode,
    wherein for each repair mode in the repair model, an aggregate repair rate is a weighted average of repair rates of the plurality of software components for the repair mode, weights being corresponding failure rates of the plurality of software components for the repair mode, and
    wherein for each repair mode in the repair model, an aggregate efficacy is an weighted average of efficacies of the plurality of software components for the repair mode, weights being corresponding failure rates of the plurality of software components for the repair mode.

2. The method of claim 1, wherein the repair model includes one or more repair modes.

3. The method of claim 2, wherein the one or more repair modes of the repair model include component soft-reset, component warm-restart, component cold-restart, component fail-over, node reboot and cluster reboot.

4. The method of claim 1, wherein the combining step further comprises:
    for each repair mode in the repair model, aggregating failure rates of each of the plurality of software components;
    for each repair mode in the repair model, aggregating repair rates of each of the plurality of software components; and
    for each repair mode in the repair model, aggregating efficacies of each of the plurality of software components.

5. The method of claim 1, wherein the determining repair rates step further comprises:
    specifying times that a bare platform and the cluster requires for rebooting a node and the cluster;
    specifying an efficacy for node reboots;
    defining cluster specific summation functions for obtaining restart times; and
    combining the restart times.

6. The method of claim 1, wherein the determining the plurality of component availability models step further includes,
    building an escalation graph for each of the plurality of software components.

7. The method of claim 6, wherein the escalation graph for each software component includes a weighted directed graph with its nodes representing repair modes for the software component and its edges having transition rates.

8. The method of claim 1, wherein the constructing step further comprises:
    calculating a plurality of state-space parameters;
    constructing a state-space model of the cluster; and
    solving the state-space model.

9. The method of claim 8, wherein the plurality of state-space parameters include aggregate failure rates, aggregate repair rates, aggregate efficacies, and the repair rates for node and cluster reboots, and
    wherein an aggregate failure rate, an aggregate repair rate and an aggregate efficacy is assigned to each repair mode in the repair model.

10. The method of claim 8, wherein the state-space model is represented as a weighted directed graph with its nodes representing states and its edges having transition rates.

11. The method of claim 10, wherein the states are based on the repair model.

12. The method of claim 1, wherein the plurality of component availability models include models for operation system software and models for non-operating system software.

13. A system for modeling the availability of a cluster, the cluster having a plurality of software components and at least one node, the system comprising:
    means for determining a plurality of component availability models using a repair model and a plurality of failure parameters, each of the plurality of component availability models corresponding to one the plurality of software components, wherein the plurality of failure parameters include a failure rate, repair rate and efficacy;
    means for combining the plurality of component availability models, wherein the combining means comprises means for obtaining aggregate failure rates, aggregate repair rates, and aggregate efficacies for the plurality of component availability models and wherein the aggregate failure rates, the aggregate repair rates and the aggregate efficacies are obtained for each repair mode in the repair model;
    means for determining repair rates for node and cluster reboots; and
    means for constructing an availability model based on the repair rates and the combined plurality of component availability models;
    wherein for each repair mode in the repair model, an aggregate failure rate is a sum of failure rates of the plurality of software components for the repair mode,
    wherein for each repair mode in the repair model, an aggregate repair rate is a weighted average of repair rates of the plurality of software components for the repair mode, weights being corresponding failure rates of the plurality of software components for the repair mode, and
    wherein for each repair mode in the repair model, an aggregate efficacy is a weighted average of efficacies of the plurality of software components for the repair mode, weights being corresponding failure rates of the plurality of software components for the repair mode.

14. The system of claim 13, wherein the repair model includes one or more repair modes.

15. The system of claim 14, wherein the one or more repair modes of the repair model include component soft-reset, component warm-restart, component cold-restart, component fail-over, node reboot and cluster reboot.

16. The system of claim 13, wherein the combining means further comprises:
    for each repair mode in the repair model, means for aggregating failure rates of each of the plurality of software components;
    for each repair mode in the repair model means for aggregating repair rates of each of the plurality of software components; and
    for each repair mode in the repair model, means for aggregating efficacies of each of the plurality of software components.

17. The system of claim 13, wherein the determining repair rates means further comprises:
    means for specifying times that a bare platform and the cluster requires for rebooting a node and the cluster;
    means for specifying an efficacy for node reboots;
    means for defining cluster specific summation functions for obtaining restart times; and
    means for combining the restart times.

18. The system of claim 13, wherein the determining the plurality of component availability models means further includes,
    means for building an escalation graph for each of the plurality of software components.

19. The system of claim 18, wherein the escalation graph for each software component includes a weighted directed graph with its nodes representing repair modes for the software component and its edges having transition rates.

20. The system of claim 13, wherein the constructing means further comprises:
    means for calculating a plurality of state-space parameters;
    means for constructing a state-space model of the cluster; and
    means for solving the state-space model.

21. The system of claim 20, wherein the plurality of state-space parameters include aggregate failure rates, aggregate repair rates, aggregate efficacies, and the repair rates for node and cluster reboots, and
    wherein an aggregate failure rate, an aggregate repair rate and an aggregate efficacy is assigned to each repair mode in the repair model.

22. The system of claim 20, wherein the state-space model is represented as a weighted directed graph with its nodes representing states and its edges having transition rates.

23. The system of claim 22, wherein the states are based on the repair model.

24. The system of claim 13, wherein the plurality of component availability models include models for operation system software and models for non-operating system software.

25. A computer program product comprising a computer useable medium having computer readable code embodied therein for modeling the availability of a cluster, the cluster having a plurality of software components and at least one node, the computer program product adapted when run on a computer to effect steps including:
    specifying a repair model, the repair model having one or more repair modes;
    specifying a plurality of failure parameters,
    for each software component in the plurality of software components, assigning values to the plurality of failure parameters for each appropriate repair mode for the software component,
    constructing an escalation graph for each of the plurality of software components;
    combining values of the plurality of failure parameters of the plurality of software components for each repair mode in the repair model;
    determining repair rates for node and cluster reboots; and
    constructing an availability model based on the repair rates and the combined plurality of failure parameters.

26. The method of claim 25, wherein the one or more repair modes include component soft-reset, component warm-restart, component cold-restart, component fail-over, node reboot and cluster reboot.

27. The method of claim 25, wherein the plurality of failure parameters includes a failure rate, repair rate and efficacy.

28. The method of claim 25, wherein the combining step further includes:
    for each repair mode in the repair model, aggregating values of each of the plurality of failure parameters.

* * * * *